UNITED STATES PATENT OFFICE.

IVAN F. HARLOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING POTASSIUM CARBONATE.

1,400,542.      Specification of Letters Patent.     Patented Dec. 20, 1921.

No Drawing. Application filed June 16, 1916, Serial No. 103,974. Renewed November 3, 1921. Serial No. 512,574.

*To all whom it may concern:*

Be it known that I, IVAN F. HARLOW, a citizen of the United States, and resident of Midland, county of Midland, and State of Michigan, have invented a new and useful Improvement in Methods of Making Potassium Carbonate, of which the following is a specification, the principle of the invention being herein explained and the best mode in which I have contemplated applying that principle, so as to distinguish it from other inventions.

The present method or process has more particular regard to the treatment of natural alkali plains liquor for the extraction or recovery of the potassium therein. Such potassium, as well as sodium, is found present in the liquor in question in the form of carbonates, sulfates and chlorids, and there are of course present corresponding salts of other metals in smaller quantities. In dealing with an alkaline solution, or bittern, of this sort, whatever its source, I have found that the methods for making potassium carbonate utilized by German manufacturers in handling the Strassfurt deposits, and particularly Engel's so-called magnesia process, are not adaptable. In other words, both the carbonating step in the treatment of the original brine and the decomposition of the double salt of potassium and magnesium carbonate obtained therefrom have to be accomplished in a different manner from any that, so far as I am aware, has heretofore been known or employed in a connection such as stated.

The object of the present invention is to provide a mode of treatment for solutions or bitterns of the kind in question, whereby the potassium salts therein may be economically recovered with few and easily performed steps or operations. To the accomplishment of the foregoing and related ends, the invention, then, consists of the steps hereinafter fully described and particularly pointed out in the claims.

The following description sets forth in detail one approved method of carrying out the invention, such disclosed mode, however, constituting but one of the various ways in which the principle of the invention may be used.

As at present obtainable in manufacturing centers, the alkali plains liquor, for use with which the present process is more particularly designed, is ordinarily evaporated close to or beyond the point of saturation so that crystals are frequently found deposited in quantity. Such solution, however, as used in my process is preferably diluted to approximately 12° Bé.

To this solution I first add tri-hydrate magnesium carbonate ($MgCO_3.3H_2O$) which remains in suspension in the solution. Thereupon the mixture is carbonated by being passed down a suitable tower against an ascending stream of carbon dioxid ($CO_2$). I have found that it is quite important to keep the temperature of the solution during this stage of the process relatively low, namely, between 18° and 25° C., the best working temperature apparently being about 20° C. It will also be understood that an excess of alkalinity is always present. Under the specified temperature conditions, then, the double salt, potassium-magnesium carbonate ($MgCO_3.KHCO_3.4H_2O$) is precipitated without any formation whatever of either magnesium chlorid or sulfate, the reaction being represented by the following equation:

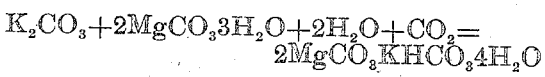

It will be understood that during this carbonating step the liquor with the admixed magnesium carbonate is passed through the tower a number of times, approximately forty-eight hours being required to secure complete carbonation.

The precipitated double salt is next filtered out and washed, and the cake thereupon "creamed" up with pure distilled water, and heated moderately, for example, to approximately 45° C.

The result of thus heating the mixture of the double salt and water is promptly to decompose such salt, giving the desired potassium carbonate ($KHCO_3$) in solution and leaving tri-hydrate magnesium carbonate ($MgCO_3.3H_2O$) as a precipitate. Such magnesium carbonate is then filtered out and utilized in the treatment of further solution, as in the step first above described.

The treatment of the original liquor just described is carried out with one or more repetitions until the proportion of potassium salts in the residual solution is reduced to approximately one-third of the solid content. When this stage is reached I boil out the salts in such residual liquor, preferably in an open "grainer", until the salts, principally sodium salts, are thus boiled out in sufficient quantity to raise the proportion of the potassium salts to approximately forty-five per cent. of the solid content, whereupon the cycle of operations previously described may be carried out anew with the production of further potassium carbonate. As a matter of fact the solution left after the boiling out of the sodium salts will be simply added to the original solution, as received from the source of supply, and it is a matter of indifference whether it be somewhat richer or poorer in potassium salts than such natural alkali plains liquor.

It will be understood, of course that some potassium salts are crystallized out with the sodium salts in the boiling out step, so that treatment of such boiled out salts for recovery of the potassium is desirable. This, however, forms no part of the process of present interest, and need not be described in detail.

By means of the foregoing process, I am enabled to recover economically, and on a commercial basis, the potassium salts that are found in the naturally occurring bitterns of the alkali plains in the western part of the United States, and so open up a considerable source of supply of this valuable chemical.

Other modes of applying the principle of my invention may be employed instead of the one explained, change being made as regards the steps described, providing the steps stated by any of the following claims, or the equivalent of such stated steps, be employed.

I therefore particularly point out and distinctly claim as my invention:—

1. The method of extracting potassium salts from an alkaline bittern of the character described, which consists in mixing the same with tri-hydrate magnesium carbonate; subjecting such mixture to the action of carbon dioxid, at a temperature at which the double salt, potassium-magnesium carbonate is precipitated; without formation of any magnesium chlorid separating out such salt; decomposing the same into insoluble magnesium carbonate and soluble potassium carbonate; and then separating such resulting carbonates.

2. The method of extracting potassium salts from an alkaline bittern of the character described, which consists in mixing the same with tri-hydrate magnesium carbonate; subjecting such mixture to the action of carbon dioxid gas at a temperature between 18° and 25° C., whereby the double salt, potassium-magnesium carbonate, is precipitated without formation of any magnesium chlorid; separating out such salt; decomposing the same into insoluble magnesium carbonate and soluble potassium carbonate; and then separating such resulting carbonates.

3. The method of extracting potassium salts from an alkaline bittern of the character described, which consists in mixing the same with tri-hydrate magnesium carbonate; subjecting such mixture to the action of carbon dioxid gas at a temperature of approximately 20°, whereby the double salt, potassium-magnesium carbonate, is precipitated without formation of any magnesium chlorid; separating out such salt; decomposing the same into insoluble magnesium carbonate and soluble potassium carbonate; and then separating such resulting carbonates.

4. The method of extracting potassium salts from an alkaline bittern of the character described, which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt, mixing same with water and heating moderately, whereby insoluble tri-hydrate magnesium carbonate and soluble potassium carbonate are formed; and then separating such magnesium and potassium carbonates.

5. The method of extracting potassium salts from an alkaline bittern of the character described, which consists in mixing the same with tri-hydrate magnesium carbonate; subjecting such mixture to the action of carbon dioxid, at a temperature at which the double salt potassium magnesium carbonate, is precipitated without formation of any magnesium chlorid; separating out such salt, mixing same with water and heating to approximately 45° C., whereby insoluble tri-hydrate magnesium carbonate and soluble potassium carbonate are formed; and then separating such magnesium and potassium carbonates.

6. The method of extracting potassium salts from an alkaline bittern of the character described, which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt, mixing same with water and heating moderately, whereby insoluble tri-hydrate magnesium carbonate and soluble potassium carbonate are formed; separating out such magnesium carbonate; and then repeating the cycle using the magnesium carbonate, thus separated out, in the first step.

7. The method of extracting potassium salts from an alkaline bittern of the character described, which consists in mixing the same with tri-hydrate magnesium carbonate; subjecting such mixture to the action of carbon dioxid, at a temperature at which the double salt, potassium-magnesium carbonate is precipitated without formation of any magnesium chlorid; separating out such salt; removing sodium salts from residual solution until approximately original proportion of potassium salts is present; and then repeating the cycle with such solution.

8. The method of extracting potassium salts from an alkaline bittern of the character described, which consists in mixing the same with tri-hydrate magnesium carbonate; subjecting such mixture to the action of carbon dioxid, at a temperature at which the double salt, potassium-magnesium carbonate is precipitated without formation of any magnesium chlorid; separating out such salt; and decomposing same into insoluble magnesium carbonate and soluble potassium carbonate; removing sodium salts from residual solution until approximately original proportion of potassium salts is present; and then repeating the cycle with such solution.

9. The method of extracting potassium salts from an alkaline bittern of the character described, which consists in mixing the same with tri-hydrate magnesium carbonate; subjecting such mixture to the action of carbon dioxid, at a temperature at which the double salt, potassium-magnesium carbonate is precipitated without formation of any magnesium chlorid; separating out such salt; and decomposing same into insoluble magnesium carbonate and soluble potassium carbonate; boiling out sodium salts from residual solution until approximately original proportion of potassium salts is present; and then repeating cycle with such solution.

10. The method of extracting potassium salts from an alkaline bittern of the character described, which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt, mixing same with water and heating moderately, whereby insoluble tri-hydrate magnesium carbonate and soluble potassium carbonate are formed; separating out such magnesium carbonate; removing sodium salts from residual solution until approximately original proportion of potassium salts is present; and then repeating the cycle with such solution, using the magnesium carbonate separated out in the first cycle.

11. The method of extracting potassium salts from an alkaline bittern in which such salts are present in excess of one-third of the solid content; which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt and decomposing same into insoluble magnesium carbonate and soluble potassium carbonate; and then repeating the foregoing steps with residual solution until proportion of potassium salts therein is reduced to approximately one-third of solid content.

12. The method of extracting potassium salts from an alkaline bittern in which such salts are present in excess of one-third of the solid content, which consists in mixing the same with tri-hydrate magnesium carbonate; subjecting such mixture to the action of carbon dioxid, at a temperature at which the double salt, potassium magnesium carbonate, is precipitated without formation of any magnesium chlorid, separating out such salt and decomposing same into insoluble magnesium carbonate and soluble potassium carbonate; repeating the foregoing steps with residual solution until proportion of potassium salts therein is reduced to approximately one-third of solid content; then removing sodium salts from such solution until approximately original proportion of potassium salts is present; and then repeating cycle with such solution.

13. The method of extracting potassium salts from an alkaline bittern in which such salts are present in excess of one-third of the solid content, which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt and decomposing same into insoluble magnesium carbonate and soluble potassium carbonate; repeating the foregoing steps with residual solution until proportion of potassium salts therein is reduced to approximately one-third of solid content; boiling out sodium salts from such solution until approximately original proportion of potassium salts is present; and then repeating cycle with such solution.

14. The method of extracting potassium salts from an alkaline bittern in which such salts are present in excess of one-third of the solid content, which consists in mixing the same with tri-hydrate magnesium carbonate; subjecting such mixture to the action of carbon dioxid, at a temperature at which the double salt, potassium magnesium carbonate, is precipitated without formation of any magnesium chlorid; separating out such salt; mixing same with water and heating moderately, whereby insoluble tri-hydrate magnesium carbonate and soluble potassium carbonate are formed; separating out such magnesium carbonate; and then repeating the foregoing steps with residual solution, using such separated out magnesium carbonate, until proportion of potassium salts therein is reduced to approximately one-third of solid content.

15. The method of extracting potassium salts from an alkaline bittern in which such salts are present in excess of one-third of the solid content, which consists in mixing the same with tri-hydrate magnesium carbonate; subjecting such mixture to the action of carbon dioxid at a temperature at which the double salt, potassium magnesium carbonate is precipitated without formation of any magnesium chlorid; separating out such salt; mixing same with water and heating moderately, whereby insoluble tri-hydrate magnesium carbonate and soluble potassium carbonate are formed; separating out such magnesium carbonate; repeating the foregoing steps with residual solution, using such separated out magnesium carbonate, until proportion of potassium salts therein is reduced to approximately one-third of solid content; then removing sodium salts from such solution until approximately original proportion of potassium salts is present; and then repeating cycle with such solution.

16. The method of extracting potassium salts from an alkaline bittern in which such salts are present in excess of one-third of the solid content, which consists in mixing the same with tri-hydrate magnesium carbonate; subjecting such mixture to the action of carbon dioxid, at a temperature at which the double salt, potassium magnesium carbonate is precipitated without formation of any magnesium chlorid; separating out such salt; mixing same with water and heating moderately, whereby insoluble tri-hydrate magnesium carbonate and soluble potassium carbonate are formed; separating out such magnesium carbonate; repeating the foregoing steps, with residual solution, using such separated out magnesium carbonate, until proportion of potassium salts therein is reduced to approximately one-third of solid content; boiling out sodium salts from such solution until approximately original proportion of potassium salts is present; and then repeating cycle with such solution.

17. In a method for recovering valuable constituents from an alkaline brine, the steps which consist in mixing a bittern containing potassium and other salts as stated with tri-hydrate magnesium carbonate; and then subjecting such mixture to the action of carbon dioxid at a temperature between 18° and 25° C., whereby the double salt, potassium magnesium carbonate is precipitated without formation of any magnesium chlorid.

18. In a method for recovering valuable constituents from an alkaline brine, the steps which consist in mixing a bittern containing potassium and other salts as stated with tri-hydrate magnesium carbonate; and then subjecting such mixture to the action of carbon dioxid at a temperature of approximately 20° C., whereby the double salt, potassium magnesium carbonate, is precipitated without formation of any magnesium chlorid.

Signed by me, this 13th day of June, 1916.

IVAN F. HARLOW.

Attested by—
 JNO. F. OBERLIN,
 ARTHUR N. PATRIARCHE.